(12) United States Patent
Smith (10) Patent No.: US 8,201,518 B2
(45) Date of Patent: *Jun. 19, 2012

(54) EGG VACCINATION APPARATUS

(76) Inventor: David Fredrick Smith, Santana de Parnaiba (BR)

( * ) Notice: Subject to any disclaimer, the term of this patent is extended or adjusted under 35 U.S.C. 154(b) by 88 days.

This patent is subject to a terminal disclaimer.

(21) Appl. No.: 12/758,933

(22) Filed: Apr. 13, 2010

(65) Prior Publication Data

US 2010/0192859 A1  Aug. 5, 2010

Related U.S. Application Data

(63) Continuation-in-part of application No. 11/584,775, filed on Oct. 20, 2006, now Pat. No. 7,721,674.

(30) Foreign Application Priority Data

Apr. 16, 2006  (BR) .................................. 8601558 U (51) Int. Cl.
*A01K 45/00* (2006.01)
(52) U.S. Cl. .......................................... 119/6.8; 119/6.6
(58) Field of Classification Search .................... 119/6.8, 119/6.6; *A01K 29/00, 45/00*
See application file for complete search history.

(56) References Cited

U.S. PATENT DOCUMENTS

| | | | | |
|---|---|---|---|---|
| 5,136,979 A * | 8/1992 | Paul et al. | ...................... | 119/6.8 |
| 6,240,877 B1 * | 6/2001 | Bounds | .......................... | 119/6.8 |
| 7,721,674 B2 * | 5/2010 | Smith | ............................. | 119/6.8 |
| 2002/0074362 A1 * | 6/2002 | Py et al. | ......................... | 222/388 |
| 2004/0144324 A1 * | 7/2004 | Gross et al. | .................... | 119/6.8 |
| 2005/0039688 A1 * | 2/2005 | Correa et al. | .................. | 119/6.8 |

* cited by examiner

*Primary Examiner* — David Parsley
*Assistant Examiner* — Thien Thanh Pham
(74) *Attorney, Agent, or Firm* — J. Charles Dougherty (57) ABSTRACT

An automatic egg injection machine comprises a separate injector support grid and injector locking device. The injector locking device is attached to the body of the egg injection machine to prevent motion during the vaccination process. Individual air tubes are inserted into slots in the injector locking device, and are inflated with compressed air to lock the injectors in place during the injection process, thereby minimizing the possibility of injector movement. Both the injector support grid and injector locking device can be exchanged for other components with different egg configurations so that one egg injection machine can be used for more than one sized incubator egg flat.

12 Claims, 4 Drawing Sheets

EGG VACCINATION APPARATUS

CROSS-REFERENCE TO RELATED APPLICATIONS

This application is a continuation-in-part of prior co-pending U.S. utility application Ser. No. 11/584,775, filed on Oct. 20, 2006 and entitled "Egg Vaccination Apparatus," such application in turn claiming priority from prior Brazilian patent application serial no. MU8601558-3, filed on Apr. 17, 2006. Each of these applications is hereby incorporated fully by reference.

STATEMENT REGARDING FEDERALLY SPONSORED RESEARCH OR DEVELOPMENT

Not applicable.

BACKGROUND OF THE INVENTION

The process of vaccinating eggs is important in the medical field and in poultry production. In medicine, eggs are used to incubate biological material utilized in the production of vaccines. In poultry production, the objective of in-egg vaccination is to protect the birds from endemic diseases.

Embryos receiving vaccine three days before hatching instead of the first day after hatching have more time to develop antibodies and consequently have a greater resistance to diseases. In this process, the vaccine ideally is applied directly into the amniotic fluid cavity of the egg, without penetration of the embryo. The incubation time for a chicken embryo is 21 days, and in-egg vaccination is normally performed three days prior to hatching, during the routine process of transferring the eggs from an incubator machine to a hatcher machine. The eggs, which have previously been secured in incubator trays in a vertical position with the wider end of the egg up, are transferred in sets of one to four "flats" (trays) into hatcher baskets, where they are allowed to lay down in unencumbered positions so that they can hatch without injury to the birds.

The egg is composed of a shell, a membrane adhering to the inside of the shell, an interior membrane holding the embryo within the amniotic fluid, and an area between the two membranes holding the allantoidal fluid. As the egg is incubated, the outer membrane gradually separates from the shell, creating an air cell. This air cell is located in the top of the egg as per its position in the incubator tray. The process of vaccinating in-egg must be done with care to avoid cracking the egg shell or penetrating the embryo, either of which can be fatal to the embryo.

To distribute the vaccine to the injectors, the technology taught by U.S. Pat. No. 6,240,877 utilizes a sealed pressurized air chamber constructed of rigid acrylic within which air pressure is applied to a collapsible plastic vaccine bag suspended within the chamber, forcing the liquid vaccine from the bag into the distribution system. The chamber is composed of a rigid acrylic chamber that is secured into a base plate, forming a tight seal. One or more vaccine bags are placed on a holder within the chamber that supports the bag in an upright position and flexible tubing is connected to an adapter on the bottom of the bag. The flexible tubing passes through a sealed "O" ring in the base of the chamber. This tubing is the vaccine distribution line and is connected to a distribution manifold that distributes the vaccine to the injectors. Compressed air is fed into the chamber and the vaccine bag is put under pressure in order to force the vaccine to the injectors. The injectors are opened and closed in a timed operation to deliver vaccine to the eggs.

A major problem with the device taught by the '877 patent is safety. The rigid acrylic chamber is kept constantly under pressure from compressed air. This pressure places strain on the internal surface area of the chamber, and as the stress of usage progresses the plastic begins to weaken. Furthermore, any mishandling of the chamber during cleaning or storage can cause fractures which might not be apparent to the operator. If this chamber should rupture while under pressure, shredded pieces of plastic could cause injury to the operators.

Another serious problem with the device taught by the '877 patent could occur in the course of the routine working day when replacing the used vaccine bag for a new bag full of vaccine. To change the vaccine bag it is necessary to first remove all pressure from the chamber. If an inattentive employee does not drain the pressure before removing the chamber, the chamber would be forced off the base with an explosive pressure that could cause serious injury.

There is also a problem with the accuracy of vaccine dosage in the device taught by the '877 patent. To distribute vaccine into the vaccination system, the compressed air exerts pressure on the vaccine bag, forcing the vaccine into the flexible tubing leading to the vaccine distribution manifold. From the distribution manifold, the vaccine continues on to the individual injectors that receive a timed amount of vaccine. A problem occurs because of fluctuations in the pressure being exerted on the vaccine bag in the pressure chamber. This pressure is read and corrected within the chamber. However, the causes of the change in pressure occur at the individual needles where the vaccine is injected. When the needles puncture the eggs and the vaccine begins to be injected, there is an immediate drop in pressure in the vaccine line which influences how much vaccine flows through the line. The response to that pressure drop will only begin to occur when the pressure change reaches the chamber where the pressure sensor reads the drop and then more air pressure is applied. By that time, the injection process will have been completed and while more air pressure is being applied within the chamber, the vaccine lines are closed and pressure within the lines is increasing. In other words, by measuring the pressure in the pressure chamber at the farthest point from where the line opens and closes to deliver vaccine, the pressure control system is always working to compensate for changes that have already occurred, and this affects vaccine dosage. It can also affect the quality of the vaccine, which is pressure sensitive. If the pressure on the vaccine goes above 5 psi it can damage and perhaps crush the vaccine cells. Since the pressure in the device taught by the '877 patent is measured and controlled in the chamber, there are no direct controls on the pressure in the vaccine line. In fact, the pressure in the line is not known. Even though the pressure is maintained at a safe level in the chamber, it is possible that at the ends of the vaccine lines, the pressure can rise above that safe pressure level.

Finally, the device taught by the '877 patent has no automatic turn-off system when the vaccine bags are empty. If the operator does not notice that the vaccine bags are empty, the vaccinator continues to operate without injecting vaccine.

A current technology for a platform securing injectors over eggs to be injected is taught by U.S. Pat. No. 5,136,979. The device taught by the '979 patent utilizes a platform composed of two plates, a stabilizer plate and a tooling plate, which are attached together so that they raise and lower as one unit, with aligned holes in each through which injectors are guided. The plates are fixed to air cylinders that raise and lower the plates by the addition or subtraction of air. These air cylinders are secured to the vaccinator body. The entire tooling/stabilizer platform unit with injectors rests on the air cylinders that raise and lower the unit over flats of eggs so that when in movement, the plates and injectors are being propelled and supported by columns of air. In the resting position, the injectors are supported on the lower tooling plate. When the injectors are in position for injection, a single fluid bladder located in the upper stabilizer plate is inflated with fluid to secure the superior portion of the injectors in place. Shell punches to open the egg and needles to deliver the vaccine within those punches are located within the injectors, and are driven from the injectors by compressed air.

In the device taught by the '979 patent, the tooling/stabilizer plates lower the injectors over the eggs to be vaccinated until the injectors make contact with the eggs. In the process of settling on the eggs, the injectors are raised slightly above the stabilizer plate and then the injectors are secured in position by the inflation of the fluid bladder located in the upper stabilizer plate, which is the plate farther away from the eggs and therefore in a less firm position for securing the injectors. The tooling/stabilizer plates are suspended from the body of the vaccinator by columns of air within the air cylinders. There are no brake locks on the plates to secure them in position. During the vaccination process, subtle vibrations are created in the plates that can cause cracks in the eggs. These vibrations are caused when there is a change in the equilibrium between the force of the injector propelling the punch and needle into the eggs and the force of the air pressure in the air cylinders securing the plates over the eggs. At the moment when the punch makes contact with the eggshell, the injectors are forced upward slightly, causing the air in the cylinders securing the plates to compress. The sudden impact of the eggshell being penetrated causes disequilibrium between the downward force of the injectors and the upper force of the air cylinders, causing a slight rise in the tooling/stabilizer plates, in turn causing a vibration that is transferred to the eggs. After penetration, there is an inverse downward pressure on the eggs until equilibrium is reached. This vibration can be harmful to the eggs, causing an uneven force of penetration and possibly cracks to the eggs when the plates come down after the air pressure in the injection device has been released.

In addition, the device taught by the '979 patent has a single fluid bladder located in the superior stabilizer portion of the stabilizer plate and a tooling plate that secures the injector once it is in contact with the egg. Because the bladder secures only the very top portion of the injector at the point most distant from the egg, there remains the possibility for lateral movement of the lower part of the injector when the punch and needle make contact with the egg, which can cause hairline cracks on the eggshell. These cracks can induce a loss of fluids from the egg and cause embryonic death. The further the fluid bladder securing the injector is from the point of contact with the egg, the greater the possibility of lateral movement, and the greater that lateral movement can be.

Furthermore, the device taught by the '979 patent utilizes a stabilizer plate and a tooling plate platform to support injectors in their proper orientation over the eggs. Each vaccinator is manufactured for one particular size and type of egg flat. Because eggs vary greatly in size, many hatcheries have two or more types of incubator egg flats with different configurations for larger and smaller sized eggs. In these hatcheries, the use of the device of the '979 patent requires a separate vaccinator machine for each type and size of egg flat.

Finally, contamination is a very major concern and must be controlled since any contaminant entering the hole made by the injector has the potential to kill the embryo. The device of the '979 patent has two plates fixed to one another and, owing to this design, it is extremely difficult to sanitize the joints between the two plates to prevent infections.

The limitations of the prior art are overcome by the present invention as described below. References mentioned in this background section are not admitted to be prior art with respect to the present invention.

BRIEF SUMMARY OF THE INVENTION

The present invention is directed to two components that, as part of an egg injection machine, control the movement of the injectors and operate independently but cooperatively for that specific purpose.

A first component of the present invention is an injector locking device, which comprises a frame with slots for inserting air tubes. These air tubes, when filled, press against the injectors and thereby hold the injectors firmly in place. By securing the injectors in this manner, the possibility of an egg cracking during vaccination is greatly diminished.

A second component of the present invention is an injector support grid, comprising a frame with openings positioned in the same configuration as the eggs positioned in a flat below the injector support grid. During the vaccination process, the injector support grid lowers the injectors through the air tubes in the injector locking device and over the eggs such that the injectors come to rest on the eggs, whereby each of the injectors are then supported by an egg instead of the injector support grid. The cap of each injector is thus lifted slightly off of the superior surface of the injector support grid. When the injector is raised from the injector support grid, the injector cap loses contact with the injector support grid and a sensor in the cap emits a signal to pass vaccine to the injector, which will then inject the egg. If there is no egg under the injector, the injector will not be raised and the cap will not lose contact with the injector support grid; as a result, the sensor will not emit a signal and no vaccine will be passed to the injector when no egg is present beneath the injector.

One of the major improvements of the present invention relative to the '979 patent is the use of two independent components, the injector support grid and the injector locking device, which operate separately and independently. The '979 patent injector platforms are raised and lowered as one unit and are supported by the same air cylinders. As the injection needles penetrate the egg shells, the downward force of the needle can cause the platform to move upward. Without a positive lock on the platform, the force of the needles penetrating the eggs puts pressure on the air cylinder securing the platform. As the air in the cylinder is compressed the platform will be forced upward, and any movement of the injection platform while the needle is in the egg can cause cracking of the egg shell and consequently death of the embryo.

In contrast to the device of the '979 patent, the present invention is directed to an independent injector locking device, which in certain embodiments is affixed directly to the structure of the egg injection machine, and an injector support grid located in a superior position to the injector locking device with its frame, in certain embodiments, attached to pneumatic air cylinders that move the injectors in a vertical up and down movement through the injector locking device to put the injectors in contact with the eggs to be vaccinated. With the injector locking device firmly affixed to the structure of the egg injection machine and the air tubes inflated, there is no movement of the injection locking device and, therefore, no movement of the injectors that could result in cracking of the eggs.

In addition, the present invention represents a major improvement over other models of egg injection machines in that the injector locking device and the injector support grid can be interchanged with other injector locking devices and the injector support grids so that hatcheries that use different egg trays, with different configurations to accommodate different sized eggs, need only purchase one egg injection machine to work with one or more injector locking devices and injector support grids, thus allowing all the eggs being hatched to be vaccinated with one machine.

Another advantage of the present invention is that because the injector support grid and the injector locking device are separate from one another, each component may be easily and conveniently sanitized without being removed from the egg injection machine.

These and other features, objects and advantages of the present invention will become better understood from a consideration of the following detailed description of the preferred embodiments and appended claims, in conjunction with the drawings as described following:

DETAILED DESCRIPTION OF THE PREFERRED EMBODIMENTS

With reference now generally to FIGS. 1-7, the preferred embodiment of the present invention may be described. Injector locking device 1 is preferably composed of a plastic, aluminum, or stainless steel frame 2 with slots 6 for inserting inflatable and expandable air tubes 3, which can preferably be encased in plasticized fiber tubes 4 for increased durability. The injector locking device 1 is preferably bolted or latched to the egg injection machine structure 12 to maintain it rigid and immovable. Air tubes 3 are placed parallel to each other within frame 2 and positioned so as to be intercalated between and outside the rows of egg injectors 7. The ends of air tubes 3 are inserted into the slots 6 in frame 2. Each tube 3 is preferably completely independent of the other tubes 3 so as to facilitate maintenance, operators being able to change the individual tubes that become defective through use. Air tubes 3 have connectors 5 on each end for attaching air lines through which air is passed for inflating and deflating tubes 3. When injectors 7 are in the correct position for injecting the eggs, compressed air is injected via high-speed, large-capacity pneumatic valves (not shown) into air tubes 3. Air tubes 3 are preferably inflated from both ends to insure rapid uniform inflation, pressing firmly against injectors 7 from opposing sides to insure that injectors 7 are maintained immobilized. Air tubes 3 are positioned close to the lower edge of injectors 7, just above the point where the needle will penetrate the egg shell, in order to most firmly secure injectors 7 during the injection process. This is important to the integrity of the eggs, since injectors 7 are being secured to have the least possible movement at the moment of impact as the injection needle penetrates the egg, thereby reducing the likelihood of cracking the egg shell. After penetration of the egg shell and injection of the vaccine, the air is quickly removed from air tubes 3 via dump valves, and injectors 7 are lifted unimpeded from the surface of the eggs.

Injector support grid 14 preferably consists of a plastic, aluminum or stainless steel frame with a grid of stainless steel wire or stainless steel, aluminum or plastic bar or plate with hexagonal, octagonal or round openings 15 that are aligned generally according to the configuration of the eggs located in the incubator egg flat (tray) 19 below it. Frame 18 of injector support grid 14 is attached to one or more pneumatic air cylinders 16 in order that it may be raised and lowered. The individual injectors 7 with needles are inserted into openings 15 and positioned between air tubes 3 in injector locking device 1 so that when they are lowered by injector support grid 14 over a tray of eggs, the needles will be in position to perforate the eggshells and deliver the dosage of vaccine or other injectable material. The diameter of injectors 7 is smaller than the injector support grid openings 15, and thus caps 8 on injector 7 rest on the superior surface of injector support grid 14. The position of injectors 7 in injector support grid 14 is important, since the caps 8 of injectors 7 incorporate a sensor 10 that emits a signal and directs the release of vaccine to the needle when cap 8 loses contact with injector support grid 14.

It may be seen from the foregoing description that in the preferred embodiment of the present invention, the two components injector locking device 1 and injector support grid 14, which control the movement of injectors 7 during the injection process, are independent of each other and not attached to each other. As a result of this novel arrangement, injector locking device 1, which prevents any injector 7 movement during vaccination, can be held stable by being attached to the structure of egg injection machine 12, while injector support grid 14, which controls the vertical movement of injectors 7 before and after vaccination, can move freely. Therefore, injectors 7 have free movement, and sensors 10 in caps 8 of injectors 7 will emit signals to release vaccine when an egg is present, and no vaccine will be released when an egg is not present.

In the preferred embodiment of the present invention, elongated air tubes 3 are located in close proximity to the eggs being vaccinated, with one elongated air tube 3 placed between each row of injectors 7. The air flow into elongated air tubes 3 is controlled by at least two high pressure pneumatic dump valves (not shown for clarity) that rapidly inject large quantities of compressed air, filling elongated air tubes 3 quickly and applying pressure to a large surface area of the lower portion of injectors 7. The location of elongated air tube 3 in the preferred embodiment is critical to its ability to secure injectors 7 firmly in place. The closer that elongated air tubes 3 are to the point of contact with the eggs, the less mobility is possible for the needles of injectors 7 with respect to the eggs. Because of the large size of elongated air tubes 3 relative to the total surface area of injectors 7, injectors 7 are held in a rigid position when in contact with the egg, minimizing the possibility of vertical or lateral movement. With injectors 7 thus secured and injector locking device 1 being firmly fixed to the structure of the machine, there is a reduced possibility of vibrations or movement being passed from injector 7 to the egg at the time of penetration of the eggshell.

It may be noted from the foregoing that, in the preferred embodiment of the present invention, injector support grid 14 and independent injector locking device 1 can be exchanged for injector support grids 14 and injector locking devices 1 of different configurations, in order to conform to differently configured incubator egg flats to be used in the same egg injection machine 12. Utilizing the two independent components, one to control the vertical movement of the injectors and the other to control the horizontal or lateral movement of the injectors, makes changing the components an easy task.

It may also be noted from the foregoing that the preferred embodiment of the invention prevents the ejection of vaccine or other material when an egg is not present beneath such particular injector 7 during the vaccination procedure. Injector support grid 14 permits the use of an injector 7 with electronic or mechanical sensor 10 attached to or embedded in cap 8 of injector 7. Cap 8 of each injector 7 rests on injector support grid 14 while in its raised position. When injector support grid 14 is lowered over the eggs and injectors 7 come in contact with the eggs, injectors 7 are lifted by the eggs, and their caps 8 lose contact with injector support grid 14. Electronic or mechanical sensor 10 embedded or attached to each injector cap 8 then sends a signal to the microprocessor controlling the vaccination machine 12, which releases vaccine into injectors 7. If for any reason—such as infertile eggs having been removed during candling—there is an empty space in the incubator egg flat 19, the corresponding injector 7 is not raised, and does not lose contact with injector support grid 14. As a result, no signal is sent to release vaccine to that injector 7, and the empty space 20 will not receive a dosage of vaccine. By not injecting vaccine into empty spaces 20, there is a large cost savings resulting from the use of the preferred embodiment of the present invention, since infertile and dead embryos average 7 to 15% of the eggs being vaccinated in standard commercial hatching operations.

With reference now more specifically to each of FIGS. 1-7, detailed explanations of the preferred embodiment of the present invention will be given. The purpose of the drawings is to further the explanation of the preferred embodiment presented herein, without limiting the scope of the invention as claimed hereafter.

Figure 1:
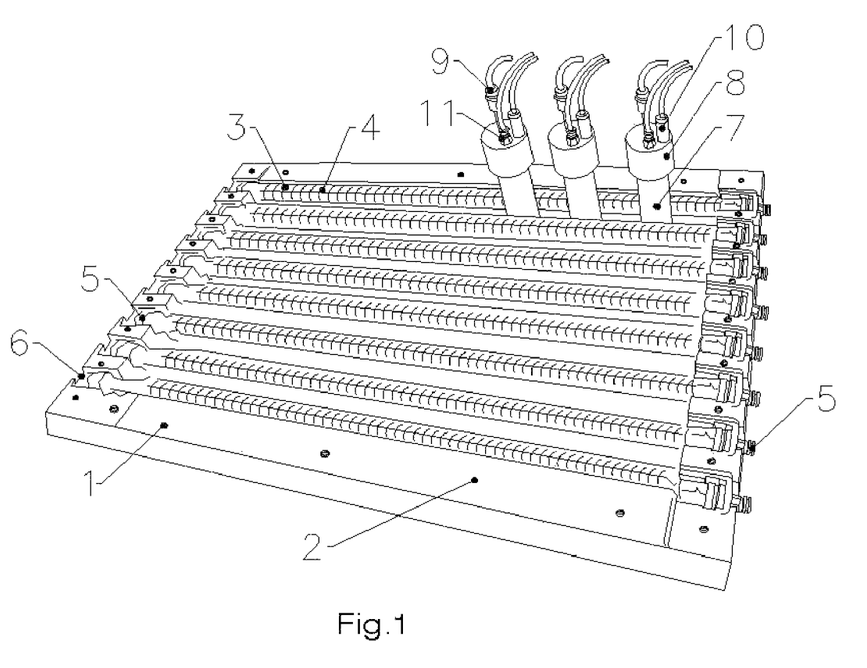
FIG. 1 is a perspective view of the injector locking device with inflatable and expandable air tubes according to a preferred embodiment of the present invention; only three injectors are shown for clarity.

FIG. 1 shows injector locking device 1 with rigid frame 2, preferably formed of stainless steel, aluminum or plastic. Inflatable and expandable air tubes 3 are preferably encased in plasticized fiber tubes 4 for increased durability, and air connectors 5 on both ends of the tubes 3 are designed for receiving compressed air. Tubes 3 are inserted into slots 6 in the plastic, aluminum or stainless steel frame 2. Also shown are three injectors 7 and their caps 8 (additional injectors omitted for clarity). Connected to each of injectors 7 is vaccine delivery tube 9; sensor 10 for detecting that injector cap 8 has lost contact with the surface of injector support grid 14; and a compressed air line 11 that functions to activate a plunger (not shown) that delivers the vaccine into the corresponding egg.

Figure 2:
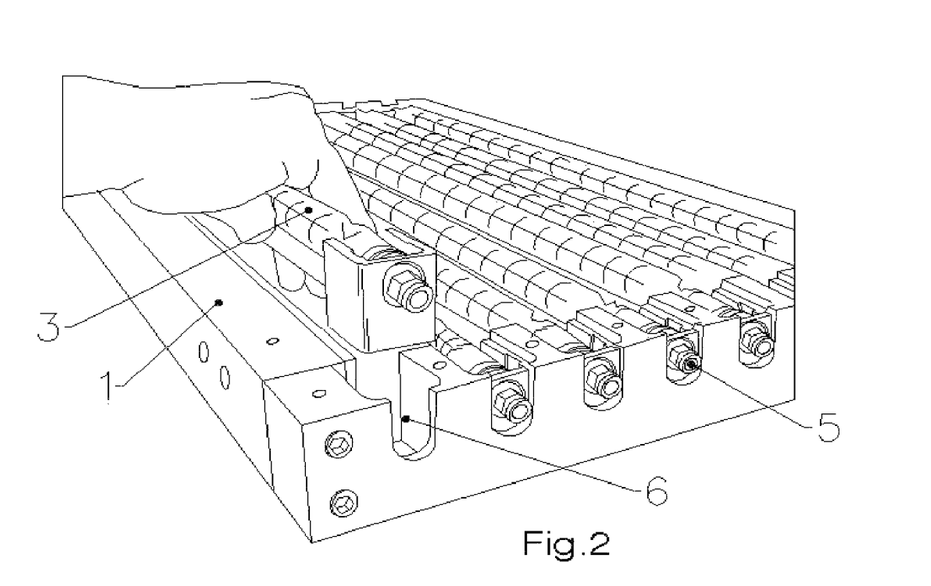
FIG. 2 is a perspective view of an individual air tube according to a preferred embodiment of the present invention, while the air tube is being inserted into a slot in the injector locking device.

FIG. 2 shows injector locking device 1 with an inflatable and expandable air tube 3 being inserted into a slot 6 and the air connectors 5 for receiving compressed air.

Figure 3:
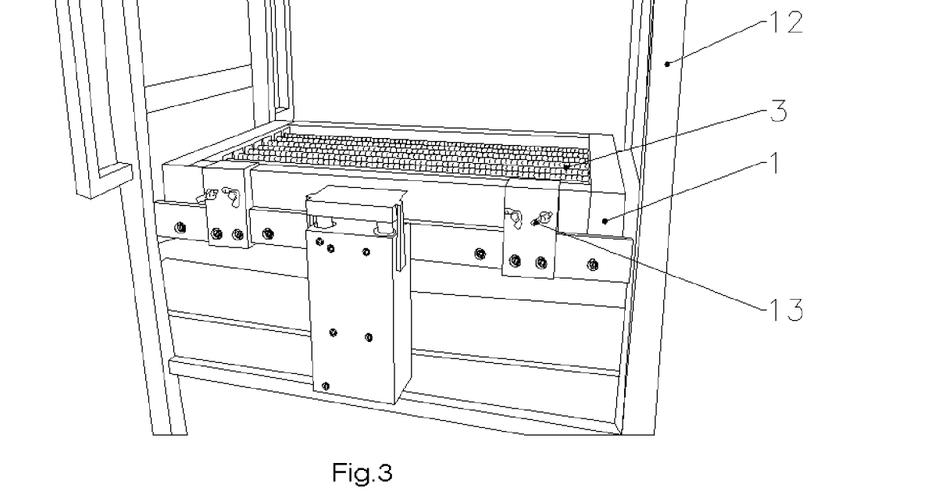
FIG. 3 is a perspective view of the injector locking device according to a preferred embodiment of the present invention, as attached to the structure of the egg injection machine.

FIG. 3 show injector locking device 1 affixed to an egg injection machine 12 by screws 13 to hold injector locking device 1 firmly so that egg injection machine 12 can absorb any motion created during the vaccination process. It may be seen from this arrangement that injector locking device 1 can be easily exchanged for other injector locking devices 1 with different configurations of eggs, as when the incubator is hatching old eggs that are of a larger size, by simply removing screws 13.

Figure 4A:
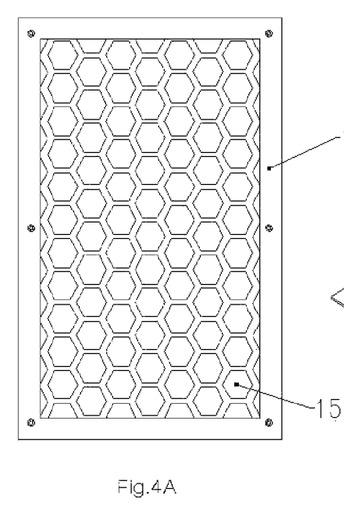
FIG. 4a is a top plan view of the injector support grid according to a preferred embodiment of the present invention.
Figure 4B:
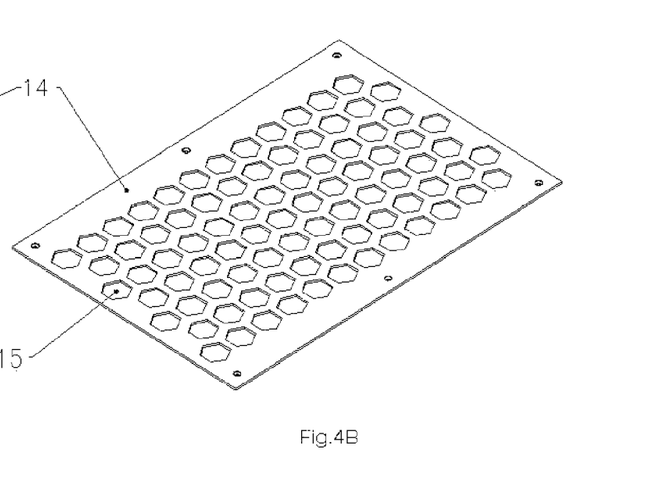
FIG. 4b is a perspective view of the injector support grid according to a preferred embodiment of the present invention.

FIGS. 4A and 4B show injector support grid 14 manufactured of stainless steel or plastic wire or bar with hexagonal, octagonal or round openings 15 (hexagonal openings are illustrated) that are aligned generally according to the configuration of the eggs located in the incubator egg flat or tray.

Figure 5:
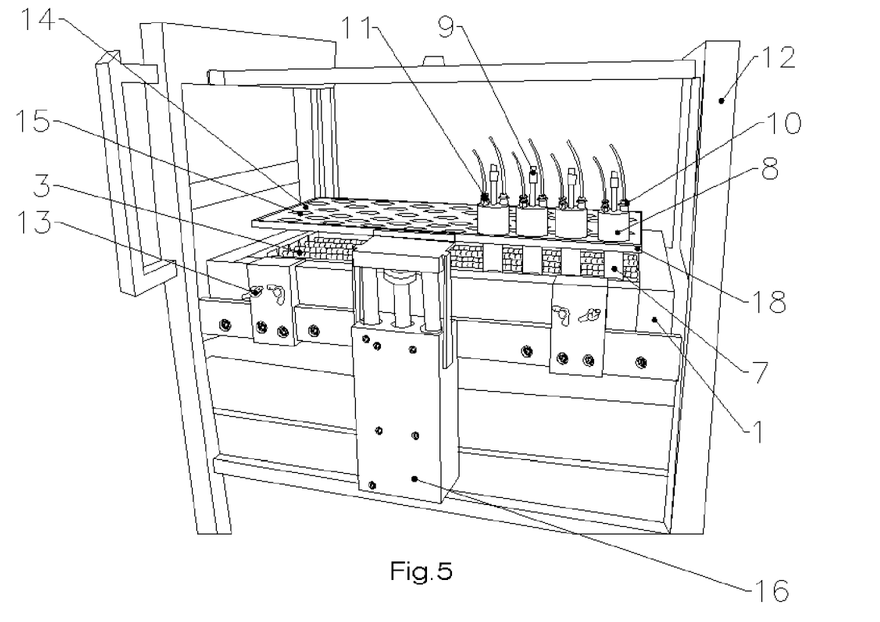
FIG. 5 is a perspective view of an egg injection machine utilizing an injector support grid and injector locking device according to a preferred embodiment of the present invention, the machine shown in the resting position before beginning the vaccination process; only four injectors are shown for clarity.

FIG. 5 shows injector support grid 14 and injector locking device 1, before initiating the vaccination process, with injector support grid 14 within its frame 18 attached to a pneumatic air cylinder 16 that lowers and raises the injector support grid 14. Injectors 7 are inserted freely into openings 15 and positioned between air tubes 3 in the injector locking device 1, with injector caps 8 resting on the upper surface of injector support grid 14. Injector locking device 1 is affixed to the structure of egg injection machine 12 by screws or quick connects fasteners 13. Injector locking device 1 has inflatable and expandable air tubes 3 that when deflated before beginning the vaccination process allow free passage of injectors 7, so that they can make contact with the eggs which will be located in the egg tray (not visible in this figure) below injector locking device 1.

Figure 6:
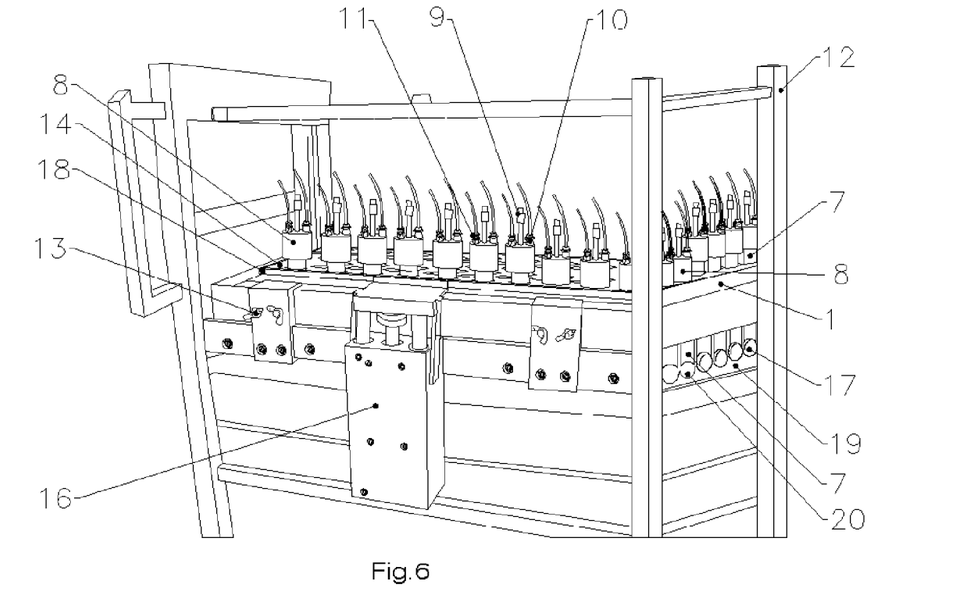
FIG. 6 is a perspective view of an egg injection machine utilizing an injector support grid and injector locking device according to a preferred embodiment of the present invention, the machine shown in position for vaccination, with the injector support grid at its lowest level, the injectors resting on top of the eggs and the egg shells being penetrated by the needles, and the caps of the injectors which are injecting eggs raised up from the injector support grid, and those injectors above spaces with no eggs continuing to rest on the upper surface of the injector support grid.

FIG. 6 shows the vaccination process in which air cylinder 16 lowers the frame 18 with injector support grid 14 to rest injectors 7 on eggs 17, and injector needles penetrate the egg shell to inject vaccine into eggs 17 in the egg tray (flat) 19. Air tubes 3 (not shown in this figure) in injector locking device 1 are inflated with air in order to secure injectors 7 firmly in place, without movement, during the vaccination process. Because some of injectors 7 are resting on top of eggs 17 and not on injector support grid 14, the corresponding injector caps 8 are slightly raised from injector support grid 14. As a result, the corresponding injector sensors 10 emit a signal to open the corresponding vaccine entrance valves 9, allowing vaccine to pass to each injector 7 and to be injected into eggs 17. In any space where an egg is missing, as in space 20 shown in the figure, injector cap 8 continues to rest on injector support grid 14, and the corresponding sensor 10 does not emit a signal to release vaccine.

Figure 7:
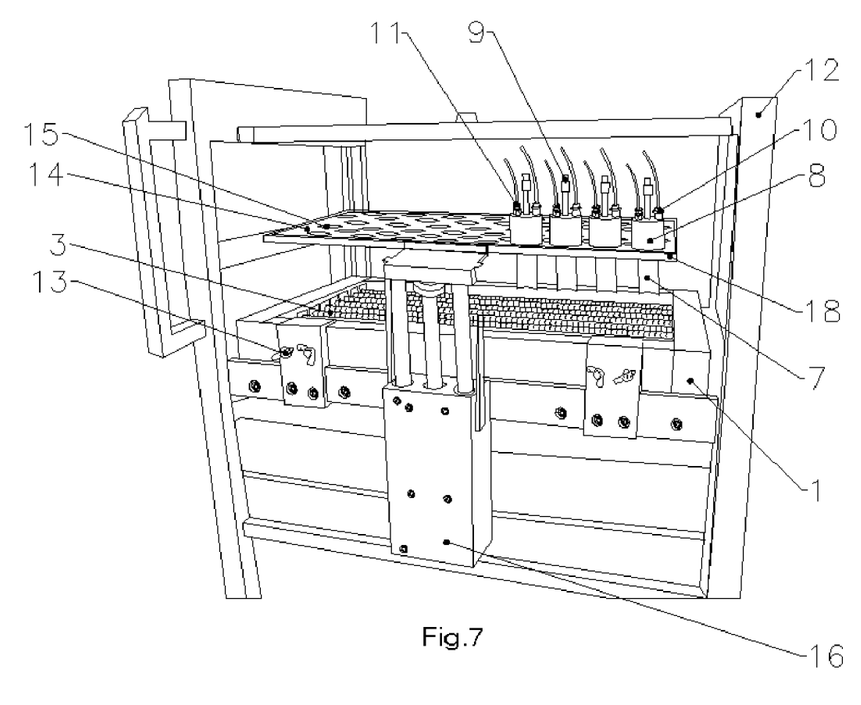
FIG. 7 is a perspective view of an egg injection machine utilizing an injector support grid and injector locking device according to a preferred embodiment of the present invention, the injector locking device and the injector support grid being in position to exchange the injector locking device for an injector locking device of a different configuration, with the injector support grid at its highest level, with the injectors removed from contact with the injector locking device in order to leave the injector locking device free to be removed from the structure of the egg injection machine.

FIG. 7 shows an interval in the vaccination process, when injector locking device 1 and injector support grid 14 can be changed so that incubator egg flats of a different configuration can be utilized with the same egg injection machine 12. Air cylinder 16 lifts frame 18 supporting injector support grid 14 to its highest point in order to remove injectors 7 from between air tubes 3 in injector locking device 1. The next step is to open the screw or quick-connect fasteners 13 and remove the injector locking device 1 and substitute the apparatus with another injector locking device 1 that will match the configuration of the new incubator egg flat. Following this, the air cylinder 16 lowers the frame 18 to its lowest position, injectors 7 are removed from openings 15 of injector support grid 14, and injector support grid 14 is removed from frame 18 and is substituted with another injector support grid 14 with the different configuration. Injectors 7 are then inserted into openings 15 of the new injector support grid 14 to continue the vaccination process.

The structure of the preferred embodiment of the present invention having now been described, its operation may be described as follows. An incubator egg flat 19 is introduced into egg injection machine structure 12 and electronic controls activate air cylinder 16, lowering injector support grid 14 and injectors 7. Injectors 7 pass freely through air tubes 3 in the injector locking device 1 until they reach eggs 17.

When injector support grid 14 has reached its lowest point and injectors 7 are resting on eggs 17, the electronic controls activate high-pressure air valves to fill air tubes 3 located inside injector locking device 1, as shown in FIG. 6. Air tubes 3 are positioned between the rows of injectors 7 and on their outsides, as shown in FIG. 1. Once inflated, they completely surround injectors 7, exerting a constant pressure. The position of injector locking device 1, closest to the needle exit on each injector 7, is considered the most ideal so that air tubes 3 firmly secure injectors 7, since the origin of vibrations that can cause egg cracks comes from the needle impact with the shell of eggs 17, which inversely applies pressure on injectors 7.

When injectors 7 come to rest on eggs 17, as shown in FIG. 6, injector caps 8, which have been resting on the upper side of injector support grid 14, are slightly raised from injector support grid 14. Sensor 10 in injector cap 8 then sends an electronic signal to the electronic controls and vaccine is released into that injector 7. If there is an empty space 20 under any one injector 7, as when an infertile egg had been removed during a previous candling process, that injector cap 8 will remain resting on injector support grid 14. The sensor 10 in the corresponding injector cap 8 will not send a signal to the electronic controls, and no vaccine will be released into that injector 7.

After the eggs 17 have been injected, the electronic controls signal the high-capacity pneumatic dump valves to remove the compressed air from air tubes 3, eliminating the pressure against injectors 7 inside injector locking device 1, leaving them to move freely. Injector support grid 14 is raised to its starting position, removing injectors 7 from contact with eggs 17. Incubator egg flat 19 is removed and the next incubator egg flat 19 with unvaccinated eggs is inserted into egg injection machine 12.

Hatcheries will often have incubator egg flats 19 with different configurations to accommodate variations in egg size. Injector locking device 1 and injector support grid 14 are constructed for a specific incubator egg flat configuration. However, the preferred embodiment is designed for an easy and rapid exchange of apparatus so that one egg injection machine can be used with all of the configurations of flats manufactured for any one model of incubator. To change injector locking device 1, the electronic controls signal pneumatic air cylinder 16 to raise injector support grid 14 to its highest position as shown in FIG. 7, removing injectors 7 from contact with injector locking device 1. With injector locking device 1 free of injectors 7, injector locking device 1 is removed by undoing screws or quick-connect fasteners 13 securing injector locking device 1 to egg injection machine frame 12, substituting it with the appropriate injector locking device 1 for the next incubator egg flat 19 to be inserted. Injector support grid 14 is then lowered to its lowest position and injectors 7 are manually removed from the openings, removing injector support grid 14 from frame 18 attached to air cylinder 16 and inserting a different injector support grid 14 with the new configuration. After the new injector support grid 14 has been installed, injector support grid 14 is lowered as in FIG. 5 and all injectors 7 are inserted into the appropriate holes and between air tubes 3 in injector locking device 1. Injection machine 12 is thus ready to vaccinate eggs in the incubator egg flat 19 with the new configuration.

As used herein, "comprising" is synonymous with "including," "containing," or "characterized by," and is inclusive or open-ended and does not exclude additional, unrecited elements or method steps. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Thus, additional embodiments are within the scope of the invention and within the following claims.

In general the terms and phrases used herein have their art-recognized meaning, which can be found by reference to standard texts, journal references and contexts known to those skilled in the art. The preceding definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as set forth in the appended claims.

I claim:

1. An apparatus for an egg injection machine to secure a plurality of rows of injectors during a vaccination process for a plurality of eggs, comprising an injector locking device, wherein the injector locking device is comprised of a rigid frame firmly affixed to the egg injection machine and containing rows of independent elongated air tubes arranged to be intercalated with the rows of injectors whereby once the injectors have been lowered and make contact with the eggs, the elongated air tubes in the injector locking device are inflated and secure the injectors firmly over the eggs while the eggs are injected, wherein the injectors each comprise a cap comprising a sensor, and wherein an injector support grid further comprises a surface support for the injectors wherein the sensors are configured to send a signal to release vaccine when an egg is present and the contact has thus been broken between the injector cap and the surface support, and the sensors are further configured to send no signal to release vaccine when an egg is not present and contact has not been broken between the injector cap and the surface support, the injector support further comprises grid comprises a grid having hexagonal, octagonal or round openings made from welded stainless steel wire bars or a sheet of stainless steel, aluminum or plastic or other rigid material with hexagonal, octagonal or round openings, operable to support the injectors once they have been inserted into the grid.

2. The apparatus of claim 1, wherein the elongated air tubes are constructed of inflatable and expandable plastic or rubber material encased in a plasticized fiber tube and inserted in a horizontal position into slots in a rectangular structure of stainless steel or other rigid material.

3. The apparatus of claim 1, wherein the air being injected into each elongated air tube is controlled by one or more high pressure pneumatic dump valves that rapidly inject large quantities of compressed air, filling the elongated air tubes quickly and applying pressure to a large surface area of the lower portion of the injectors to hold them firmly in place.

4. The apparatus of claim 1, wherein the elongated air tubes further comprise end connections, and further comprising pneumatic dump valves attached by tubing to the end connections, wherein the pneumatic valves are operable to allow rapid removal of compressed air from the elongated air tubes whereby the injectors can be extracted from the injector locking device.

5. The apparatus of claim 1, wherein the elongated air tubes have terminal ends that are inserted into slots in the frame of the injector locking device to facilitate maintenance whereby they can be individually changed if one becomes defective.

6. The apparatus of claim 1, wherein the injector locking device is located in close proximity to the eggs being vaccinated, with the elongated air tubes positioned to be intercalated with each row of injectors.

7. The apparatus of claim 1, wherein the injectors each comprise a needle, and wherein the apparatus further comprises an egg injection machine structure, wherein the injector locking device is affixed to the egg injection machine structure such that the egg injection machine structure absorbs vibrations from the injector locking device caused by the needles penetrating the eggs.

8. The apparatus of claim 1 wherein the injectors each comprise a needle, and wherein the injector locking device is positioned below the injector support grid nearest the eggs, in a position closest to the needles that will penetrate the eggs, in order to avoid lateral movements of the needles during the process of penetrating the egg for vaccination.

9. The apparatus of claim 1, further comprising an egg injection machine structure, and wherein said injector locking device is affixed to the egg injection machine structure by means of screws or quick connect fasteners to facilitate the exchange of the injector locking device such that more than one apparatus may be used with the egg injection machine to accommodate incubator egg flats that have different egg configurations.

10. The apparatus of claim 1, further comprising a rigid frame constructed of stainless steel, plastic or aluminum into which the injector support grid is inserted.

11. The apparatus of claim 1, further comprising at least one pneumatic cylinder attached to the structure of the egg injection machine and to the frame of the injector support grid, and wherein the pneumatic cylinder is operable to move the frame with the inserted injector support grid vertically, and to lower the injectors until they are located with the injector locking device and resting on the eggs to be vaccinated and to also raise the injectors so that they are completely removed from the injector locking device.

12. The apparatus of claim 1, comprising a plurality of interchangeable injector support grids, wherein each of the injector support grids corresponds to a particular incubator egg flat configuration, so that by changing the injector support grid, the same egg injection machine may be used to vaccinate eggs in flats with different egg configurations.

* * * * *